United States Patent
Nakamura (10) Patent No.: US 8,219,889 B2
(45) Date of Patent: Jul. 10, 2012

(54) COMMUNICATION ERROR DETECTION APPARATUS

(75) Inventor: Nobuyuki Nakamura, Osaka (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 1274 days.

(21) Appl. No.: 11/984,013

(22) Filed: Nov. 13, 2007

(65) Prior Publication Data

US 2008/0120527 A1  May 22, 2008

(30) Foreign Application Priority Data

Nov. 16, 2006  (JP) ................. 2006-310205

(51) Int. Cl.
*H03M 13/00* (2006.01)
*G06F 11/00* (2006.01)

(52) U.S. Cl. .... 714/776; 714/703; 714/712; 375/240.26

(58) Field of Classification Search .................. 714/776, 714/712, 703, 752; 375/240.26, 240.27
See application file for complete search history.

(56) References Cited

U.S. PATENT DOCUMENTS

2002/0080886 A1* 6/2002 Ptasinski et al. .............. 375/295

OTHER PUBLICATIONS

Mandayam, N.B.; Aazhang, B.; , "Importance sampling for analysis of direct detection optical communication systems," Communications, IEEE Transactions on , vol. 43, No. 234, pp. 229-239, Feb./Mar./Apr. 1995.*
Ai-Qaq, W.A.; Devetsikiotis, M.; Townsend, J.-K.; , "Stochastic gradient optimization of importance sampling for the efficient simulation of digital communication systems," Communications, IEEE Transactions on , vol. 43, No. 12, pp. 2975-2985, Dec. 1995.*
Waters, W.M.; Jarrett, B.R.; , "Bandpass Signal Sampling and Coherent Detection," Aerospace and Electronic Systems, IEEE Transactions on , vol. AES-18, No. 6, pp. 731-736, Nov. 1982.*
Orsak, G.; Aazhang, B.; , "On the theory of importance sampling applied to the analysis of detection systems," Communications, IEEE Transactions on , vol. 37, No. 4, pp. 332-339, Apr. 1989.*
Keisuke Takemori et al. "Integrated Analysis Architecture for Wide-area Security Monitoring," SCIS 2006, The 2006 Symposium on Cryptography and Information Security, Hiroshima, Japan, Jan. 17-20, 2006, The Institute of Electronics, Information and Communication Engineer.

* cited by examiner

*Primary Examiner* — Cynthia Britt
(74) *Attorney, Agent, or Firm* — Rabin & Berdo, P.C.

(57) ABSTRACT

When a communication error detection apparatus according to the present invention is initially installed, it performs a detection processing of the errors based on a sampling method in which a sampling interval of packet signals at the start of detection processing is a comparatively short. If the amount of the packet signals, which are sampled and accumulated, reaches a predetermined value, the communication error detection apparatus performs a detection processing of the errors based on another sampling method. In addition, if the detection processing of the errors is temporally released, the sampling method in which a sampling interval of packet signals is a comparatively short is used.

13 Claims, 8 Drawing Sheets

COMMUNICATION ERROR DETECTION APPARATUS

BACKGROUND OF THE INVENTION

1. Field of the Invention

The present invention relates to a communication error detection apparatus which receives packet signals from communication networks and analyzes information contained in the packet signals so as to detect errors which may have occurred in the communication networks.

2. Description of the Related Art

Computers connected to external communication networks such as Internet etc. are unfortunately infected by a malevolent program such as a computer worm. In addition, the computers infected by the worm attack a specific server, which is referred to as a DDoS (Distributed Denial of Service) attack. Recently, the malevolent program infections have been a more significant problem as the communication networks are widely used and communication traffic increases. For solving these problems, a method of acquiring information contained in packet signals over the long term is recently utilized by providing an apparatus capable of detecting errors in communication networks at a specific place of the communication networks. In the method, means for analyzing information acquired over the long term, identifying a normal communication state on the basis of the analysis result, and thus detecting errors in the communication networks on the basis of the normal communication state are utilized.

Technology, which detects errors in communication networks, is disclosed in "Integrated Analysis Architecture for Wide-area Security Monitoring, Takemori, Yamada, and Miyake, The 2006 Symposium on Cryptography and Information Security Hiroshima, Japan, Jan. 17-20, 2006, The Institute of Electronics, Information and Communication Engineers (document D1)". In document D1, by installing a plurality of monitoring apparatuses, each of which is capable of monitoring information transmitted in communication networks, in wide areas of the communication networks, the information monitored by the monitoring apparatuses is integrally analyzed, so that errors in the communication networks are effectively detected.

However, as disclosed in section 4. 1.1 of document D1, the detected errors are analyzed by comparing statistical data which are acquired just before the detection of the errors by the monitoring apparatuses with statistical data acquired from a previous week. Accordingly, it is necessary to accumulate communication information during at least one week after the monitoring apparatuses are initially installed on the communication networks, thus causing a problem that errors in the communication networks during the one week are not detected.

The monitoring apparatus disclosed in document D1 has another problem. When a connection configuration of the communication networks is definitely changed, the monitoring apparatus keeps indicating an analysis result of error even though a communication state of the communication networks is normal. This is because the communication state before the change of the connection configuration is different from that after the change of the connection configuration.

SUMMARY OF THE INVENTION

It is an aim of the present invention to provide a communication error detection apparatus that can detect errors of communication networks in a short time after the communication error detection apparatus is installed on the communication networks. In addition, the present invention aims to provide a communication error detection apparatus that can immediately and correctly detect errors that have occurred in communication networks even if a connection configuration of the communication networks is changed.

According to a first aspect of the present invention, there is provided a communication error detection apparatus comprising a packet receiving part for sequentially receiving packet signals from communication networks, a sampling part for sequentially sorting the packet signals received by the packet receiving part so as to sample accompanying information contained in the packet signals sorted thereby on the basis of a sampling method supplied thereto, an information storage part for accumulating the accompanying information sampled by the sampling part, and an error detection processing part for analyzing the accompanying information accumulated by the information storage part on the basis of a data analysis method so as to perform a detection process for detecting errors that occurred in the communication networks. The communication error detection apparatus further comprises a trigger part for respectively supplying the sampling method and the data analysis method respectively corresponding to the sampling method to the sampling part and the error detection processing part.

According to a second aspect of the present invention, there is provided a communication error detection apparatus comprising a packet receiving part for sequentially receiving packet signals transmitted on communication networks, a sampling part for sequentially sorting the packet signals received by the packet receiving part so as to sample accompanying information contained in the packet signals sorted thereby on the basis of a sampling method and information sampling intervals supplied thereto, an information storage part for accumulating the accompanying information sampled by the sampling part, and an error detection processing part for analyzing the accompanying information accumulated by the information storage part on the basis of a data analysis method so as to perform a detection process of errors that have occurred in the communication networks. The communication error detection apparatus further comprises a trigger part to respectively supply the sampling method and the data analysis methods corresponding to the sampling method to the sampling part and the error detection processing part, and an analytical control part for supplying the information sampling intervals to the sampling part every time the amount of the accompanying information accumulated in the information storage part reaches a predetermined value.

DETAILED DESCRIPTION OF THE INVENTION

First and second embodiments of the communication error detection apparatus according to the present invention will be described with reference to the accompanying drawings.

First Embodiment

Figure 1:
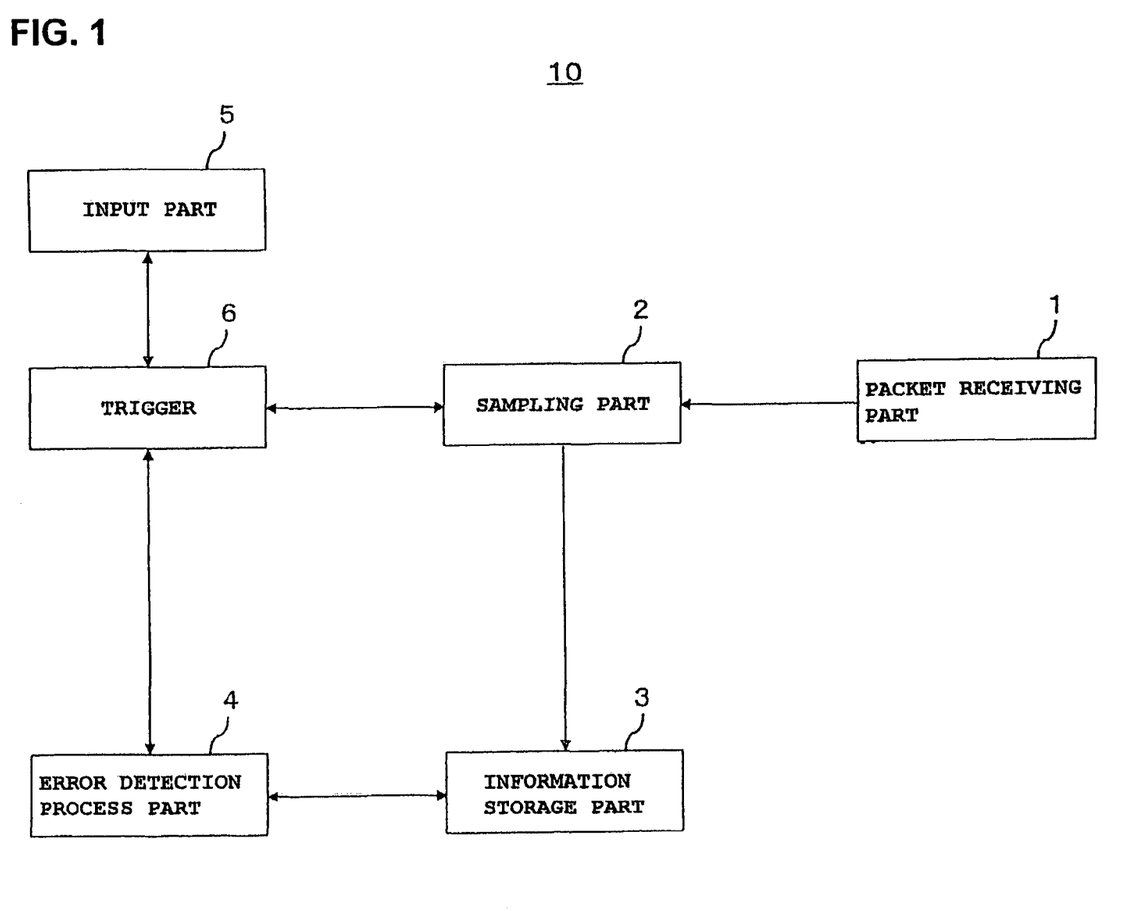
FIG. 1 is a block diagram showing a communication error detection apparatus which is a first embodiment in accordance with the present invention.

FIG. 1 is a block diagram showing a communication error detection apparatus 10 which is the first embodiment in accordance with the present invention.

The communication error detection apparatus 10 includes a packet receiving part 1, a sampling part 2, an information storage part 3, an error detection process part 4, an input part 5, and a trigger part 6.

The packet receiving part 1 sequentially receives packet signals from communication networks (not shown), and sequentially supplies packet signals received thereby to the sampling part 2.

The sampling part 2 sequentially sorts the packet signals supplied from the packet receiving part 1 on the basis of a piece of information representing a sampling method (this information being hereinafter referred to as a sampling method) supplied from the trigger part 6, and samples accompanying information contained in the sorted packet signals. Subsequently, the sampling part 2 supplies the accompanying information sampled thereby to the information storage part 3. At the same time, the sampling part 2 sends to the trigger part 6 a message that the accompanying information is supplied to the information storage part 3.

The information storage part 3 sequentially accumulates the accompanying information supplied from the sampling part 2. The information storage part 3 accumulates one part of the accompanying information, which is utilized for an error detection processing, during a certain time period. The other part of the accompanying information, which is not utilized for the error detection processing, may be deleted. In addition, the information storage part 3 supplies the accompanying information to the error detection process part 4 in response to a request from the error detection process part 4.

The error detection process part 4 requests the information storage part 3 to supply the accompanying information accumulated in the information storage part 3 in response to a start instruction of the detection processing. The start instruction of the detection processing is generated by the trigger part 6. Subsequently, the error detection process part 4 analyzes the accompanying information supplied from the information storage part 3 on the basis of a piece of information representing a data analysis method (this information being hereinafter referred to as a data analysis method) supplied from the trigger part 6, and performs the detection processing of errors occurred in the communication networks (not shown).

The input part 5 receives a release instruction of the error detection processing which instruction is input by an administrator of communication error detection apparatus 10 and an observer of the communication state. The input part 5 also receives a conversion range in which the accompanying information is converted into another accompanying information having a format different from the accompanying information. The conversion range is also input by the administrator and the observer.

The trigger part 6 generates the start instruction of the detection processing to the error detection process part 4 every time the trigger part 6 receives from the sampling part 2 the message that the accompanying information is supplied from the sampling part 2 to the information storage part 3. At an initial configuration, the trigger part 6 supplies a piece of information representing an initial sampling method (this information being hereinafter referred to as an initial sampling method) to the sampling part 2, and also supplies a piece of information representing an initial data analysis method (this information being hereinafter referred to as an initial data analysis method) corresponding to the initial sampling method to the error detection process part 4. The initial configuration is performed, for example, at the time when the communication error detection apparatus 10 is installed on the communication networks. In addition, it is configured that the trigger part 6 supplies a piece of information representing a normal sampling method (this information being hereinafter referred to as a normal sampling method), which is different from the initial sampling method, to the sampling part 2 if the accompanying information accumulated in the information storage part 3 reaches a predetermined value. It is also configured that the trigger part 6 supplies a piece of information representing a normal data analysis method (this information being hereinafter referred to as a normal data analysis method) corresponding to the normal sampling method to the error detection process part 4 if the accompanying information accumulated in the information storage part 3 reaches the predetermined value. The predetermined value of the accompanying information is at least equal to or larger than a value at which the analysis on the basis of the normal sampling method is possible. The predetermined value of the accompanying information is preliminarily memorized in the trigger part 6. Relating parameters etc. are usually supplied to the sampling part 2 at the same time as the sampling method is supplied to the sampling part 2. In the first embodiment, it is configured that the initial sampling method is a packet count base sampling and the normal sampling method is a time base sampling method. Both of the sampling methods may be standard sampling methods defined in psamp (Packet Sampling) Working group of IETF (Internet Engineering Task Force).

Figure 2:
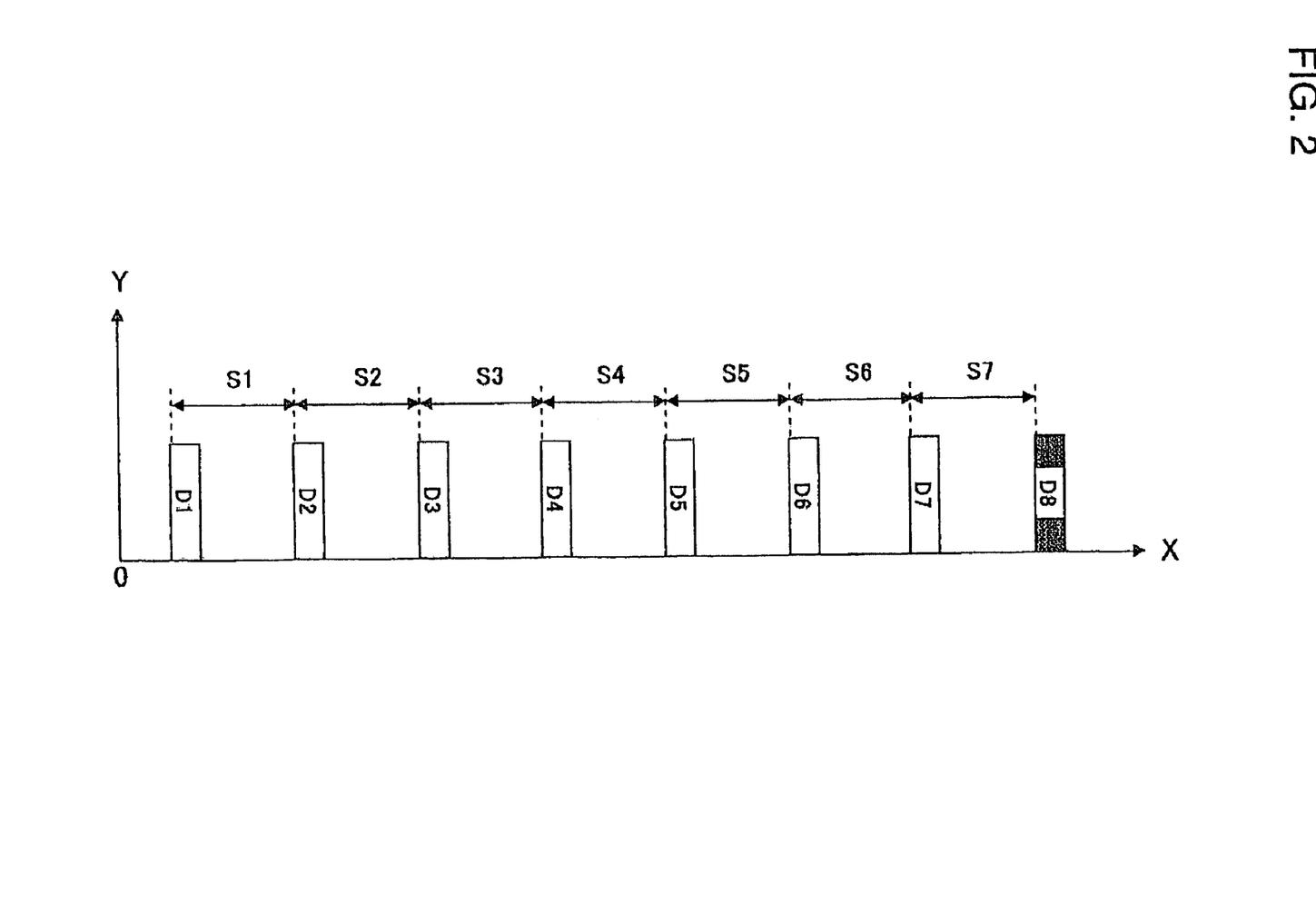
FIG. 2 is a graph showing sampling intervals of accompanying information sampled on the basis of a packet count base sampling method by the first embodiment.

FIG. 2 is figure showing an example of sampling intervals of the accompanying information sampled on the basis of the time base sampling method. X-axis and Y-axis of FIG. 2 indicates time and the amount of sampled accompanying information, respectively. D1 to D8 of FIG. 2 respectively denote sampling intervals of the accompanying information sampled by the sampling part 2. In the first embodiment, it is configured that the amount of the accompanying information sampled in the sampling intervals D1 to D8 are same each other. S1 to S7 respectively denote time intervals between the sampling intervals D1 and D2, between the sampling intervals D2 and D3, . . . , and between the sampling intervals D7 and D8. The trigger part 6, in which the sampling intervals D1 to D8 and time intervals S1 to S7 are preliminary memorized, supplies a sampling condition including the sampling intervals D1 to D8 and time intervals S1 to S7 to the sampling part 2. If at least one or more packet signals are sampled during the respective sampling intervals D1 to D8, the sampling part 2 sequentially sorts the packet signals on the basis of the sampling condition supplied from the trigger part 6, and samples accompanying information contained in the packet signals sorted thereby. In the first embodiment, it is configured that the accompanying information sampled during the sampling intervals D1 to D7 is utilized for the sake of analyzing the accompanying information sampled in the sampling interval D8.

Figure 3:
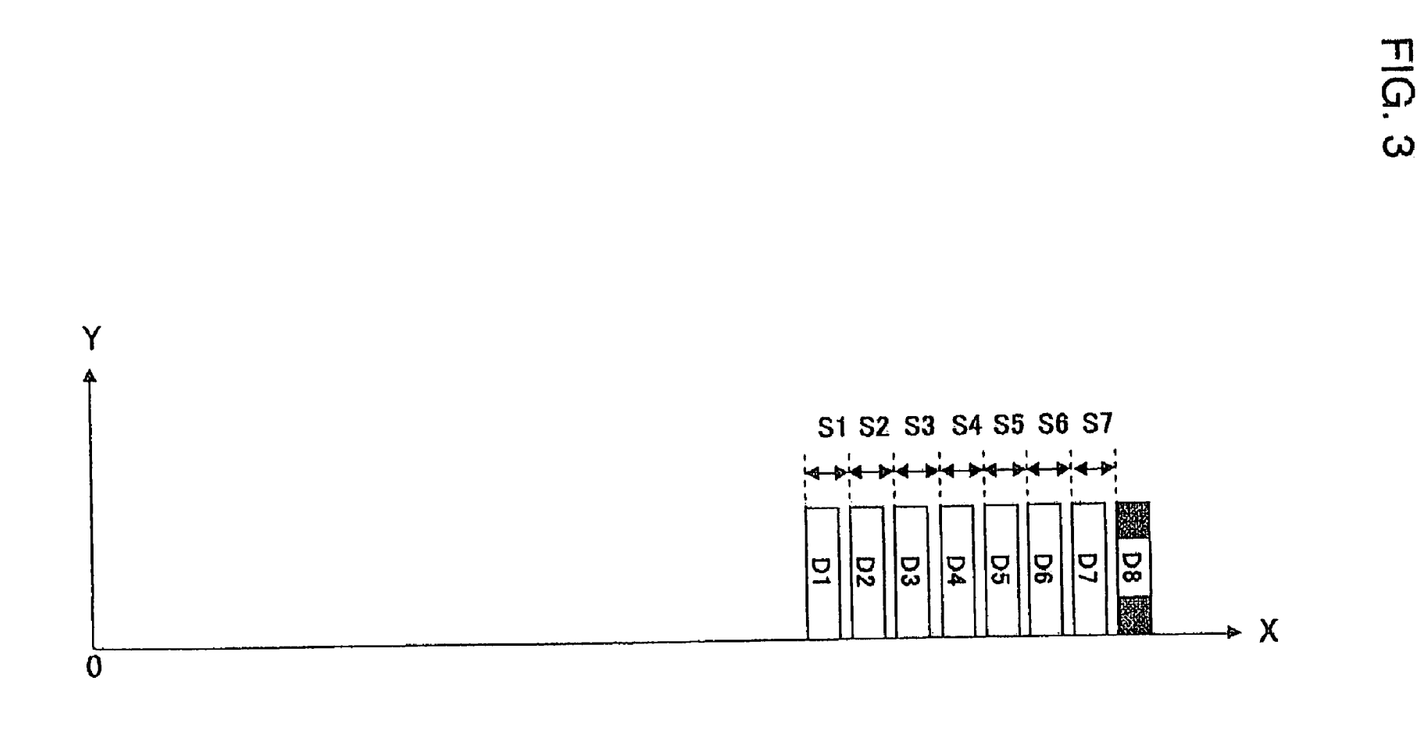
FIG. 3 is a graph showing sampling intervals of accompanying information sampled on the basis of a time base sampling method by the first embodiment.

FIG. 3 is a figure showing an example of sampling intervals of accompanying information sampled on the basis of the packet count base sampling method. X-axis and Y-axis shows time and amount of accompanying information sampled, respectively. D1 to D8 of FIG. 3 respectively denote sampling intervals of accompanying information sampled by the sampling part 2. The accompanying information contained in packet signal sequences, each of which contains at least one or more packet signal, are sampled during the respective sampling intervals D1 to D8. In the first embodiment, it is configured that the amount of the accompanying information sampled in the respective sampling intervals D1 to D8 are same to each other. S1 of FIG. 2 indicates an interval time during which the communication error detection apparatus 10 receives a packet signal sequence at D1 and a packet signal sequence at D2. Similarly, S1 to S7 of FIG. 2 respectively indicate time intervals during which the communication error detection apparatus 10 receives the packet signal sequence at D2 and a packet signal sequence at D3, the packet signal sequence at D3 and a packet signal sequence at D4, . . . , and a packet signal sequence at D7 and a packet signal sequence at D8. The sampling part 2 sequentially sorts the packet signals consisted by the packet signal sequences during the sampling intervals D1 to D8 on the basis of the sampling condition supplied from the trigger part 6, and samples accompanying information contained in the packet signals sorted thereby. In the first embodiment, it is configured that accompanying information sampled during the sampling intervals D1 to D7 is utilized for the sake of analyzing accompanying information sampled in the sampling interval D8.

The accompanying information sampled by the sampling part 2 is, for example, communication protocol information contained in the packet signals. The communication protocol information is, for example, TCP (Transmission Control Protocol) information and UDP (User Datagram Protocol) information. The error detection process part 4 discriminates whether or not a plurality of the communication protocol information accumulated in the information storage part 3 are TCP or UDP information. The error detection process part 4 analyzes respective ratios of the TCP and the UDP to total amount of the communication protocol information. It is configured that the analysis result of the ratios is a ratio in the normal state of the communication networks. The error detection process part 4 analyzes the latest accompanying information accumulated in the information storage part 3, so that the analysis result by the error detection process part 4 is updated as the latest state of the communication networks. The error detection process part 4 performs an error detection processing in which a ratio of errors occurred in the communication networks is obtained by comparing a ratio in the normal state with a ratio in the latest state.

On the basis of the time base sampling method, the accompanying information is sampled during the sampling intervals which are preliminary configured. On the packet count base sampling method, the accompanying information is sampled every time the packet signal sequences are received. Therefore, the packet count base sampling method has a merit that the sampling interval on the basis of the packet count base sampling method is shorter than that on the basis of the time base sampling method. Therefore, the error detection processing by utilizing the packet count base sampling method is immediately started in comparison with the time base sampling method. A total sampling interval of the accompanying information up to the start of the error detection processing corresponds to total interval time of S1 to S7 in the first embodiment of FIGS. 2 and 3. The total interval time of S1 to S7 on the basis of the packet count base sampling method shown in FIG. 3 is shorter than that on the basis of the time base sampling method shown in FIG. 2, indicating that the sampling intervals of the accompanying information up to the start of error detection processing on the basis of the packet count base sampling method shown in FIG. 3 is shorter than those on the basis of the time base sampling method shown in FIG. 2.

The normal state of the communication networks is determined on the basis of the accompanying information which has been already sampled. It is analyzed whether or not the present communication state is normal state by comparing the determined normal state with the latest accompanying information. Thus, analysis accuracy is improved by adequately adjusting sampling intervals of the accompanying information. Therefore, an accuracy of error detection on the basis of the time base sampling method in which the accompanying information is sampled during adequate sampling intervals preliminarily configured is higher than that on the basis of the packet count base sampling method in which the accompanying information is sampled from the packet signal sequence arriving in a short period of time. In the first embodiment, the time base sampling method and the packet count base sampling method are changed with a view to respective merits of both methods. When the communication error detection apparatus 10 is initially installed on the communication networks, the packet count base sampling method is utilized for the purpose of immediately performing the error detection processing. At the time when the amount of the accompanying information accumulated reaches the predetermined value, the packet count base sampling method is changed into the time base sampling method for the purpose of improving the accuracy of error detection.

Figure 4:
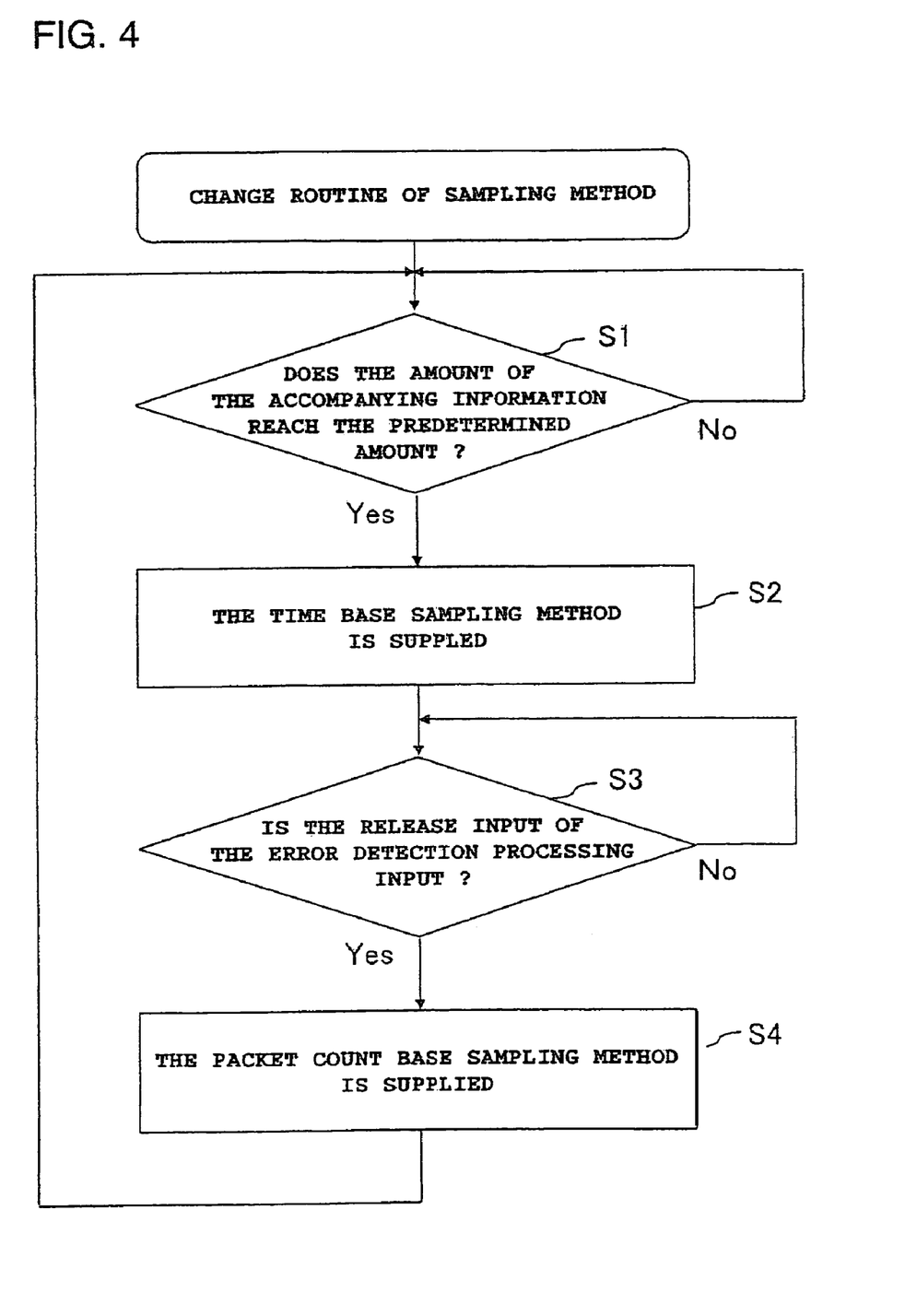
FIG. 4 is a flowchart showing a change routine of sampling methods in the first embodiment.

FIG. 4 is a flow chart showing a change routine of the sampling methods supplied from the trigger part 6. In the first embodiment, it is configured at an initial configuration the packet count base sampling method and a data analysis method corresponding to the packet count base sampling method are supplied to the sampling part 2 and the error detection process part 4, respectively. The initial configuration is performed when the communication error detection apparatus 10 is initially installed on the communication networks. The trigger part 6 distinguishes whether or not the amount of the accompanying information accumulated in the information storage part 3 reaches the predetermined value (S1). The trigger part 6 distinguishes it, for example, every time the trigger part 6 receives from the sampling part 2 a message that the accompanying information is supplied to the information storage part 3. The predetermined value of the accompanying information is at least equal to or larger than an amount at which analysis on the basis of the normal sampling method is possible. When the amount of the accompanying information accumulated in the information storage part 3 reaches the predetermined value preliminary memorized, the trigger part 6 supplies the time base sampling method to the sampling part 2 (S2). At the same time, the trigger part 6 also supplies a data analysis method corresponding to the time base sampling method to the error detection process part 4. When the input part 5 receives a release input of the detection processing (S3), the detection processing by the error detection process part 4 is temporally released and the trigger part 6 supplies the packet count base sampling method to the sampling part 2 (S4). At the same time, the trigger part 6 also supplies a data analysis method corresponding to the packet count base sampling method to the error detection process part 4. Subsequently, the trigger part 6 returns to the processing (S1) in which it is judged whether the amount of the accompanying information accumulated in the information storage part 3 reaches the predetermined value. It may be configured that a release input of the detection processing is input at the time when the sampling part 2 samples the accompanying information on the basis of the packet count base sampling method. In this case, the trigger part 6 once releases the detection processing, and supplies the packet count base sampling method to the sampling part 2.

The sampling part 2, which receives the time base sampling method from the trigger part 6, sequentially sorts packet signals supplied from the packet receiving part 1 and samples the accompanying information contained in the sorted packet signals on the basis of the time base sampling method. The sampling part 2, which receives the packet count base sampling method from the trigger part 6, sequentially sorts packet signals supplied from the packet receiving part 1 and samples the accompanying information contained in the sorted packet signals on the basis of the packet count base sampling method.

When the error detection process part 4 receives the time base sampling method from the trigger part 6, the error detection process part 4 converts all or one part of the accompanying information, which is sampled on the basis of the packet count base sampling method and accumulated in the information storage part 3, into another accompanying information whose format can be analyzed on the time base sampling method. The error detection process part 4 analyzes the converted another accompanying information and the accompanying information, which is sorted on the basis of the time base sampling method and accumulated in the information storage part 3. The error detection process part 4 also performs the detection processing of the error occurred in the communication networks. Thus, the error detection process part 4 can effectively utilizes the accompanying information accumulated in the information storage part 3. In addition, when a conversion range, in which the accompanying information is converted, is input into the input part 5 by an administrator or an observer of the communication error detection apparatus 10, the error detection process part 4 can converts all or one part of the accompanying information, which are sampled on the basis of the packet count base sampling method and accumulated in the information storage part 3, into another accompanying information whose format can be analyzed on the basis of the time base sampling method and range is based on the conversion range input into the input part 5. In the case that the accompanying information, which are sampled on the basis of the packet count base sampling method and accumulated in the information storage part 3, can not be converted in accompanying information whose format can be analyzed on the basis of the time base sampling method, the sampling part 2 samples accompanying information, whose format can be analyzed on the basis of the time base sampling method from the time of the initial installation of communication error detection apparatus 10, along with the sampling of the accompanying information whose format can be analyzed on the basis of the packet base sampling method. From the time when the sampling method is changed into the time base sampling method, the sampled accompanying information, whose format can be analyzed on the basis of the time base sampling method, is utilized. Thus, the error detection processing can be performed immediately from the time when the sampling method is changed into the time base sampling method.

Figure 5:
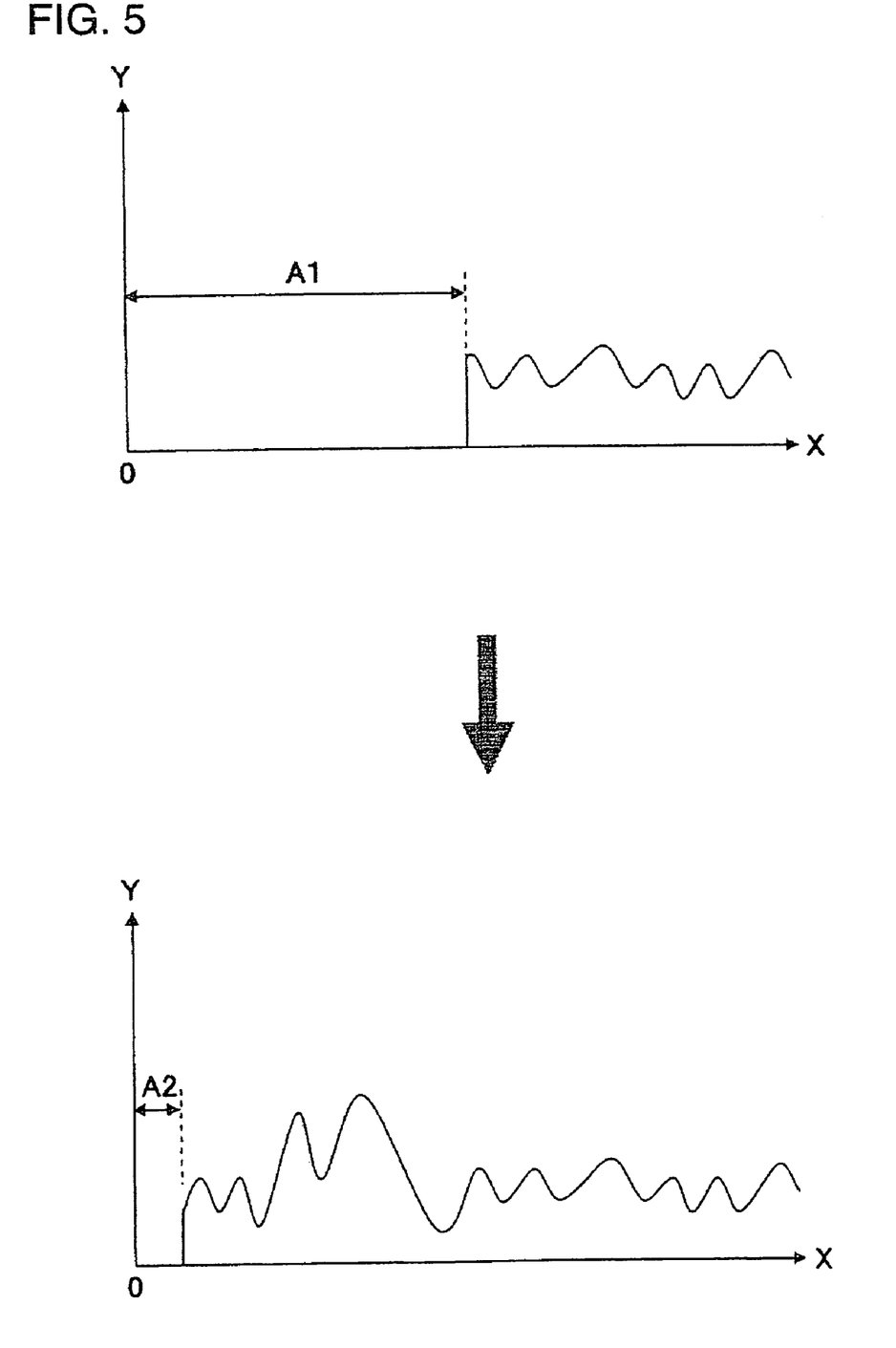
FIG. 5 is a graph showing an analytical result of accompanying information analyzed by the first embodiment.

FIG. 5 is graph showing an example of an analysis result of accompanying information performed by the error detection process part 4. An upper part of FIG. 5, which is upper part of an arrow is an analysis result of accompanying information on the basis of the time base sampling method from the time of installation of communication error detection apparatus 10. Figure under the arrow is an example at the time of the installation of communication error detection apparatus 10 for the use of the time base sampling method if the accompanying information more than the predetermined amount memorized beforehand is accumulated by using the packet count base sampling method. X axis and Y axis of FIG. 5 indicate time and detected error level, respectively. The communication error detection apparatus 10 is installed at the time of 0 of X axis.

In the case that the time base sampling method is continuously utilized from the time of installation of the communication error detection apparatus 10, the performance of the error detection process is started at A1 denoted in the upper part of FIG. 5. In the case that the packet count base sampling method is utilized at the time of installation of the communication error detection apparatus 10, the performance of the error detection process is started at A2 denoted in the lower part of FIG. 5. After the communication error detection apparatus 10 is installed, the error detection process utilizing the packet count base sampling method is started faster in comparison with that utilizing the time base sampling method. As shown in FIG. 5, the interval A2 is shorter than A1. In addition, if the accompanying information reaching the predetermined amount preliminarily memorized is accumulated, the packet count base sampling method is changed into the time base sampling method, thus improving an accuracy of the error detection.

Figure 6:
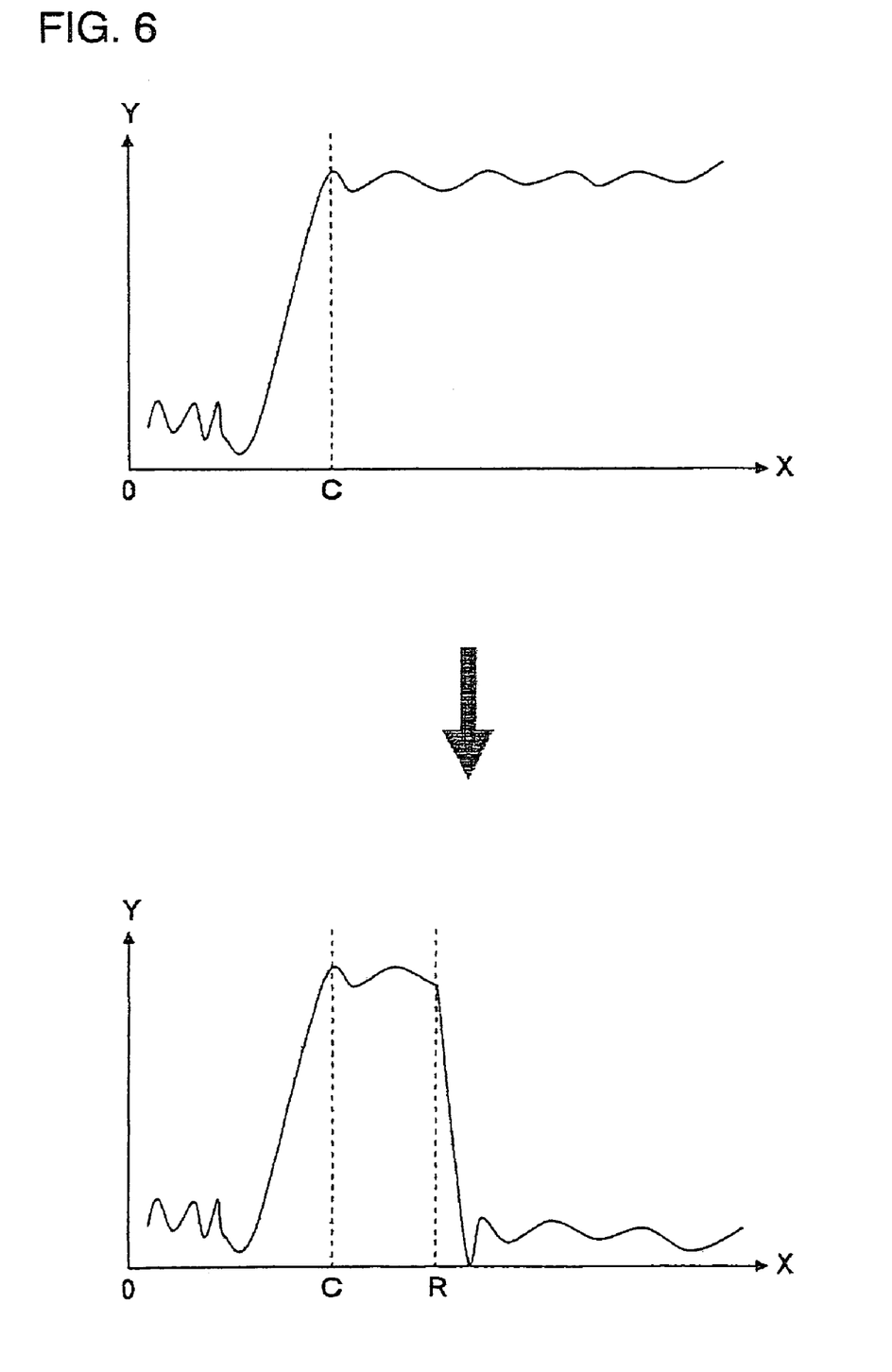
FIG. 6 is a graph showing an analytical result of accompanying information analyzed by the first embodiment.

FIG. 6 is a graph showing analytical results of the accompanying information performed by the error detection process part 4 in the cases that the error detection processing is released and not released. Upper and lower parts of FIG. 6 show analytical results in the cases that the error detection processing is released and not released, respectively. X-axis and Y-axis of the upper and lower parts of FIG. 6 indicate time and error level, respectively. A connection configuration of the communication network is changed at the time of C in upper and lower parts of FIG. 6. The input part 5 receives the release input of the detection processing at the time of R in the lower part of FIG. 6.

If a connection configuration of the communication network is changed at the time of C as shown in the upper part of FIG. 6, a normal communication state which is determined from the time of 0 to C is different from a communication state after the change of the connection configuration. Even if the communication state after the time of C is actually normal, the error level keeps high.

When an administrator and an observer of the communication error detection apparatus 10 inputs a release input into input part 5, the error detection processing is released once. For the sake of restarting the error detection processing after the error detection processing is released, the trigger part 6 supplies the packet count base sampling method and a data analysis method corresponding to the packet count base sampling method to the sampling part 2 and the analytical control part 7, respectively. In this case, the error detection processing utilizing the packet count base sampling method is performed after the time of R as shown in lower part of FIG. 6. Therefore, even if the analysis result that error level is high is indicated due to the change of connection configuration of the communication networks, by releasing the error detection processing once, the error detection processing can be restarted immediately.

The communication error detection apparatus in accordance with the present invention can detect errors on the communication networks immediately after it is installed the networks. In addition, the communication error detection apparatus in accordance with the present invention can indicate correct error detection results by releasing the error detection processing even if the connection configuration of the communication networks is changed.

Second Embodiment

Figure 7:
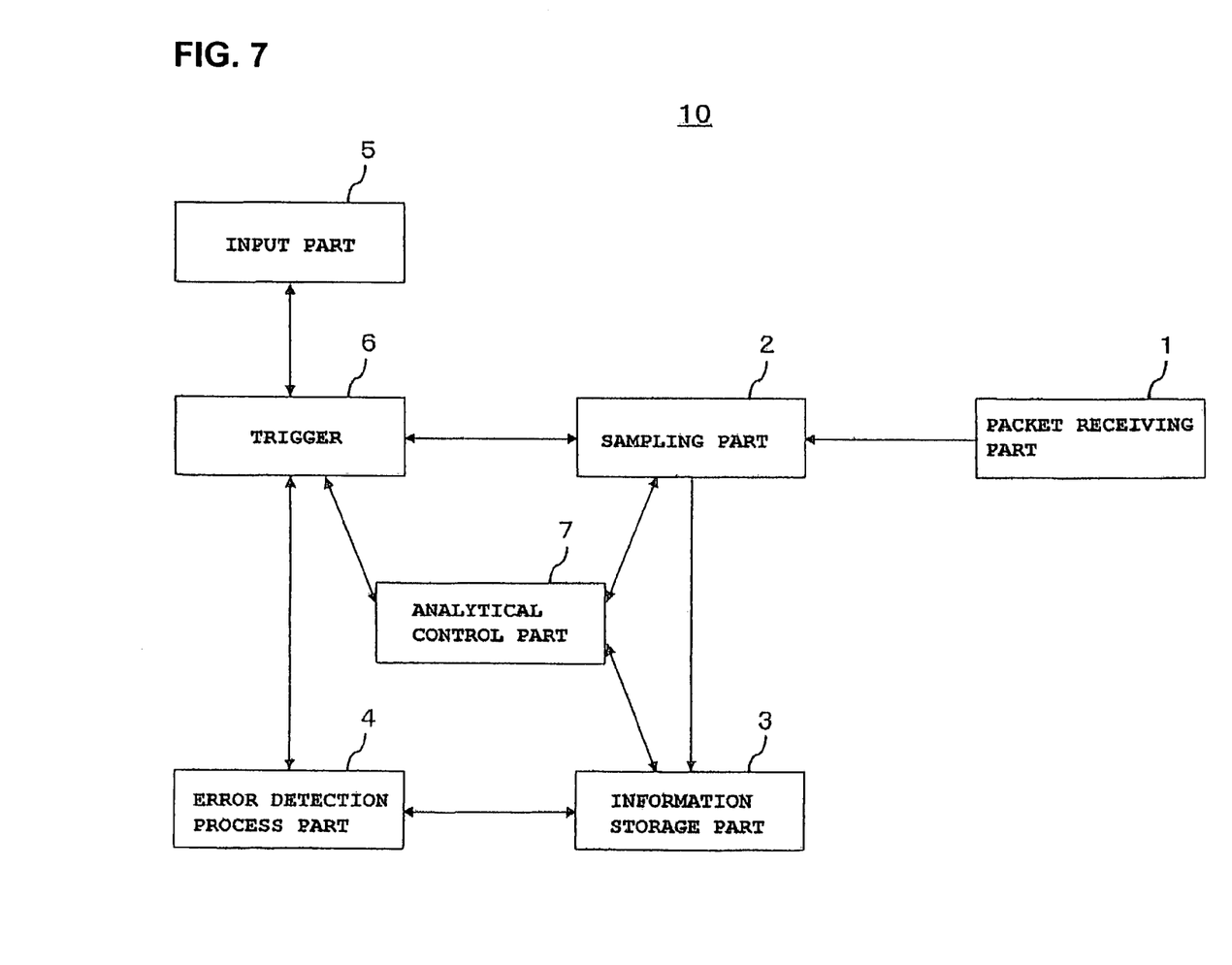
FIG. 7 is a block diagram showing a communication error detection apparatus which is a second embodiment in accordance with the present invention.

FIG. 7 is a block diagram showing a communication error detection apparatus 10 of a second embodiment in accordance with the present invention. The communication error detection apparatus 10 includes an analytical control part 7. The second embodiment is similar with the first embodiment excluding the analytical control part 7. The description of the second embodiment excluding the analytical control part 7 which is not included in the first embodiment will be omitted.

The analytical control part 7 connected to a sampling part 2 supplies information sampling intervals of the packet signals to the sampling part 2. The information sampling intervals are supplied to the sampling part 2 at the time when the communication error detection apparatus 10 is initially installed. It is configured for the purpose of analyzing accompanying information immediately after the communication error detection apparatus 10 is initially installed that the information sampling intervals are comparatively short. The analytical control part 7 supplies the information extraction intervals to the sampling part 2 every time the accompanying information accumulated in the information storage part 3 reaches a predetermined value. It is configured that the information sampling interval supplied to the sampling part 2 is longer than that supplied previously. At least one or more predetermined values and the information extraction intervals are preliminarily memorized in the analytical control part 7. The analytical control part 7, which is also connected to the information storage part 3, supplies the information sampling intervals to the sampling part 2 on the basis of the amount of the accompanying information accumulated in the information storage part 3. The analytical control part 7 combines the accompanying information which are sampled at a comparatively short information sampling interval and accumulated in the information storage part 3, so as to convert the combined the accompanying information into another accompanying information which is utilized even if accompanying information is sampled at a long information extraction interval. The analytical control part 7, which is also connected to the trigger part 6, supplies the information sampling intervals and an analytical timing of the accompanying information to the trigger part 6.

Figure 8:
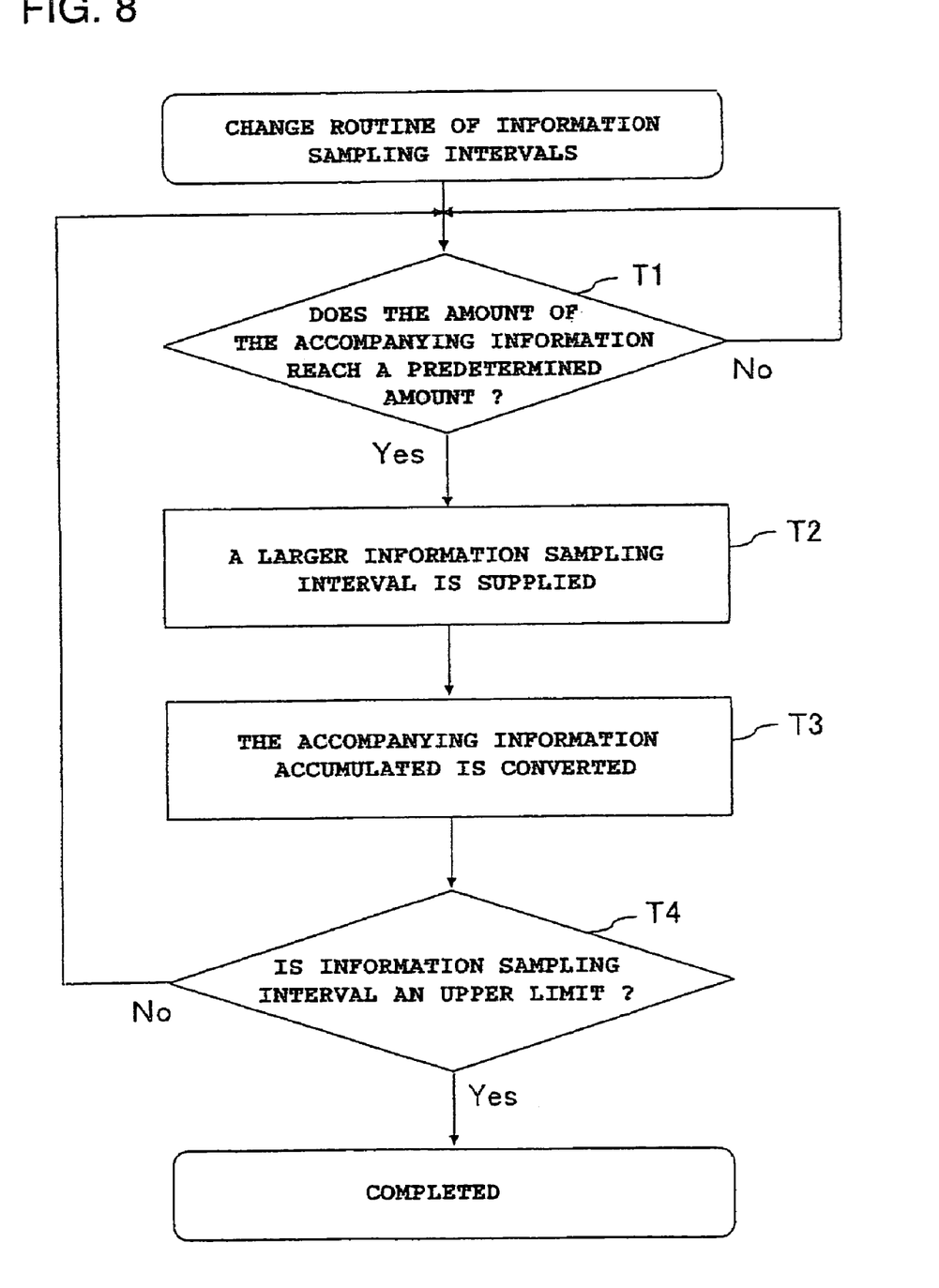
FIG. 8 is a flowchart showing a change routine of information sampling intervals in the second embodiment.

FIG. 8 is a figure showing an example of routine changes of the information sampling intervals in the analytical control part 7. In the second embodiment, it is similarly configured when the communication error detection apparatus 10 is initially installed on the communication networks that the packet count base sampling method and a data analysis method corresponding to the packet count base sampling method are supplied to the sampling part 2 and the error detection process part 4, respectively.

The analytical control part 7 distinguishes whether or not the amount of the accompanying information accumulated in the information storage part 3 reaches a predetermined value (T1).

The processing of T1 is performed in such a manner that the analytical control part 7 compares the amount of the accompanying information accumulated in the information storage part 3 with a smaller predetermined value in sequence every time the sampling part 2 samples the accompanying information.

When the accompanying information accumulated in the information storage part 3 reaches one of the predetermined values (T1), the analytical control part 7 supplies an information sampling interval which is longer than previous one to the sampling part 2 (T2). The information sampling interval supplied to the sampling part 2, extent of which an analysis accuracy does not decrease drastically, is configured. The analytical control part 7 converts the accompanying information which are sampled at a comparatively short information sampling interval and accumulated in the information storage part 3 into another accompanying information which is utilized at a long information extraction interval (T3). Since the analysis accuracy decreases as the information sampling interval increases, the analytical control part 7 supplies a constant information sampling interval if the information sampling interval reaches an upper limit. If the information sampling interval does not reaches the upper limit (T4), the process returns back to the processing of T1 in which it is distinguished whether or not the amount of the accompanying information reaches the predetermined value (T1). The upper limit of the information sampling interval is preliminarily memorized in the analytical control part 7. The sampling part 2 receives the information sampling intervals from the analytical control part 7 through the processes shown in FIG. 8, thus sampling the accompanying information while the sampling intervals are stepwisely increased.

In similar to the first embodiment, the trigger part 6 supplies the time base sampling method and a data analysis method corresponding to the time base sampling method to the sampling part 2 and the error detection process part 4, respectively, if the amount of the accompanying information accumulated in the information storage part 3 reaches a predetermined value. It is normally configured that the predetermined value is larger than that utilized when the information sampling interval is enlarged. In similar to the first embodiment, the error detection process part 4 converts all or one part of the accompanying information, which is sampled on the basis of the packet count base sampling method and accumulated in the information storage part 3, into another accompanying information whose format can be analyzed on the time base sampling method. The analytical control part 7, which does not change the sampling interval, sends a message of an analytical timing to the trigger part 6 until the accompanying information reaches the amount necessary for analyzing on the basis of the time base sampling method after the change processing of the information extraction interval is completed.

When a connection configuration of the communication networks is changed and an administrator of the communication error detection apparatus 10 and an observer of the communication state release the error detection processing on the input part 5, the error detection processing is temporarily released in similar to the first embodiment. At the time when the sampling processing of the accompanying information is started again after the error detection processing is released, the analytical control part 7 supplies an information sampling interval with a comparatively narrow width to the sampling part 2, and supplies a sampling interval with a comparatively broad width in response to an increase of the accompanying information amount. As the sampling interval of the accompanying information is short, the amount of the accompanying information necessary for analyzing can be accumulated within a short period of time. Thus, the error detection processing can be started again immediately. However, there is a possibility that the amount of the accompanying information accumulated in the information storage part 3 exceed a storage capacitor if the accompanying information is accumulated over a long period of time. As described above, the accompanying information is initially accumulated at a narrower sampling interval. Thus, the error detection processing can be started immediately. Moreover, if the accompanying information, whose amount does not decrease the analysis accuracy, is accumulated, the information sampling interval with broader width is supplied. The error detection processing can be performed while suppressing the amount of the accompanying information accumulated in the information storage part 3 and maintain the analysis accuracy.

The second embodiment of the communication error detection apparatus according to the present invention can detect errors of communication networks in a short term after the communication error detection apparatus is installed on the communication networks. In addition, the second embodiment can correctly detect errors in a short term by temporarily releasing the error detection processing even if a connection configuration of the communication networks is changed.

This application is based on Japanese Patent Application No. 2006-310205 which is herein incorporated by reference.

What is claimed is:

1. A communication error detection apparatus, comprising:
    a packet receiving part which sequentially receives packet signals from a communication network;
    a sampling part which sequentially sorts said packet signals received by said packet receiving part and samples accompanying information contained in said sorted packet signals based on a sampling method supplied to said sampling part;
    an information storage part which accumulates said accompanying information sampled by said sampling part; and
    an error detection processing part which analyzes said accompanying information accumulated by said information storage part based on a data analysis method corresponding to said sampling method and which performs a detection process for detecting errors that occurred in said communication network; and
    a trigger part which respectively supplies said sampling method and said data analysis method to said sampling part and said error detection processing part, said trigger part including
        initial sampling means for supplying an initial sampling method to said sampling part as said sampling method and for supplying an initial data analysis method corresponding to said initial sampling method to said error detection processing part as said data analysis method when said communication error detection apparatus is installed on said communication network, and
        normal sampling means for supplying a normal sampling method to said sampling part as said sampling method and for supplying a normal data analysis method corresponding to said normal sampling method to said error detection processing part as said data analysis method when an amount of said accompanying information accumulated in said information storage part has reached a predetermined value.

2. A communication error detection apparatus according to claim 1, further comprising an input part to receive a release input of said detection process performed by said error detection processing part, wherein said trigger part further includes a mean for temporally releasing said detection process in response to said release input so as to temporarily supply said initial sampling method to said sampling part and said initial data analysis method to said error detection processing part.

3. A communication error detection apparatus according to claim 1, wherein said error detection processing part includes mean for converting at least part of said accompanying information, which is sampled based on said normal sampling method and accumulated in said information storage part, into another accompanying information having a format that can be analyzed based on said normal data analysis method when said normal data analysis method is supplied from said trigger part, and for analyzing both said another accompanying information and said accompanying information sampled based on said normal sampling method and accumulated in said information storage part so as to perform said detection process for detecting said errors that occurred in said communication network.

4. A communication error detection apparatus according to claim 3 further comprising:
    an input part which receives a conversion range in which at least part of said accompanying information accumulated by said information storage part is converted into said another accompanying information.

5. A communication error detection apparatus according to claim 1, wherein a sampling interval for sampling said accompanying information based on said initial sampling method up to a start of said detection process is smaller than a sampling interval for sampling said accompanying information on the basis of said normal sampling method.

6. A communication error detection apparatus according to claim 1, wherein said initial sampling method is a packet count base sampling method and said normal sampling method is a time base sampling method.

7. A communication error detection apparatus according to claim 1, wherein said accompanying information is a communication protocol contained in said packet signal.

8. A communication error detection apparatus according to claim 1, wherein said detection process performed by said error detection processing part is performed so as to detect an error level on said communication network by comparing a normal communication state and a latest state, said normal state being determined from an analytical result of said accompanying information accumulated in said information storage part, and the latest state being determined from an analytical result of said accompanying information which is updated and accumulated in said information storage part.

9. A communication error detection apparatus, comprising:
    a packet receiving part which sequentially receives packet signals from a communication network;
    a sampling part which sequentially sorts said packet signals received by said packet receiving part and samples accompanying information contained in said packet signals based on a sampling method and information sampling intervals supplied to said sampling part;
    an information storage part which accumulates said accompanying information sampled by said sampling part; and
    an error detection processing part which analyzes said accompanying information accumulated by said information storage part based on a data analysis method corresponding to said sampling method and which performs a detection process for detecting errors that occurred in said communication network;

a trigger part which respectively supplies said sampling method and said data analysis method to said sampling part and said error detection processing part; and an analytical control part which supplies said information sampling intervals to said sampling part every time an amount of said accompanying information accumulated in said information storage part reaches a predetermined value, said information sampling interval supplied to said sampling part by said analytical control part being larger than a previous information sampling interval.

10. A communication error detection apparatus according to claim 9, wherein said analytical control part converts said accompanying information, which is sampled at one of said information sampling intervals and accumulated in said information storage part, into another accompanying information having a format that is analyzed by said error detection processing part after the one of said information sampling intervals is supplied.

11. A communication error detection apparatus according to claim 9, further comprising: an input part that receives a release input of said detection process, and wherein said analytical control part includes mean for temporally releasing said detection process in response to said release input and supplying said information sampling intervals to said sampling part.

12. A communication error detection apparatus according to claim 9, wherein said accompanying information is a communication protocol contained in said packet signal.

13. A communication error detection apparatus according to claim 9, wherein said detection process performed by said error detection processing part is performed so as to detect an error level on said communication network by comparing a normal communication state and a latest state, said normal state being determined from an analytical result of said accompanying information accumulated in said information storage part, and the latest state being determined from an analytical result of said accompanying information which is updated and accumulated in said information storage part.

* * * * *